March 9, 1937.   E. J. HIRVONEN   2,073,518
HYDRAULIC MACHINE TOOL
Filed Oct. 8, 1932   6 Sheets-Sheet 2

Inventor.
Eric J. Hirvonen

March 9, 1937.　　　E. J. HIRVONEN　　　2,073,518
HYDRAULIC MACHINE TOOL
Filed Oct. 8, 1932　　　6 Sheets-Sheet 3
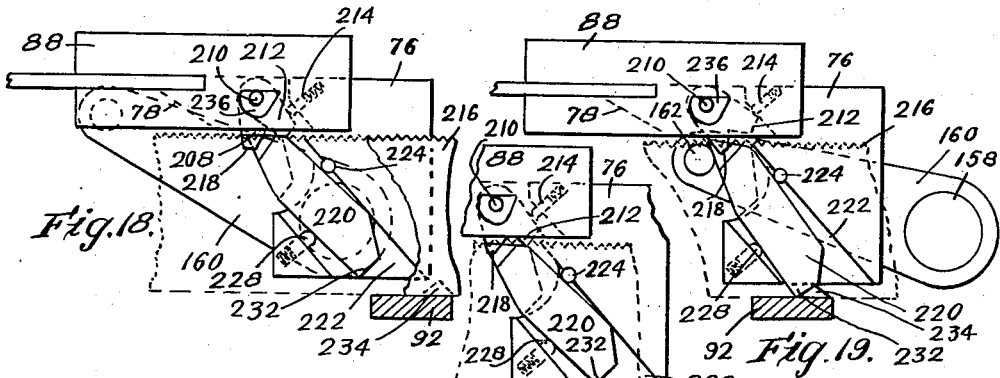
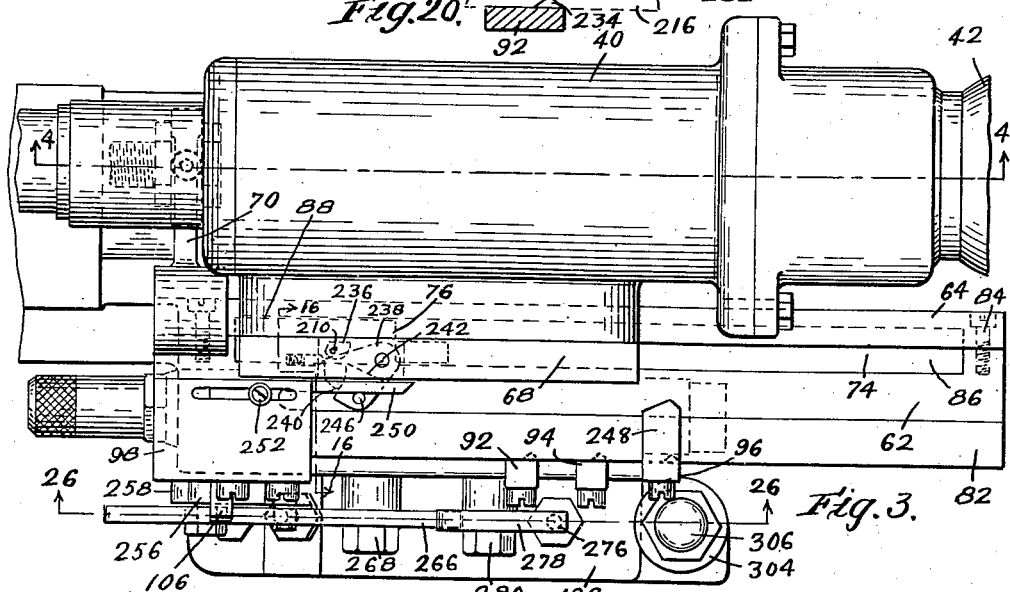
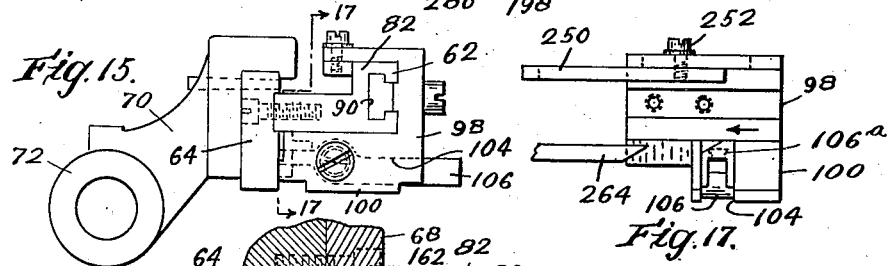
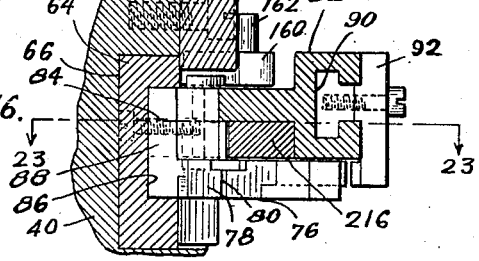
Inventor,
Eric J. Hirvonen March 9, 1937.　　　E. J. HIRVONEN　　　2,073,518
HYDRAULIC MACHINE TOOL
Filed Oct. 8, 1932　　　6 Sheets-Sheet 4
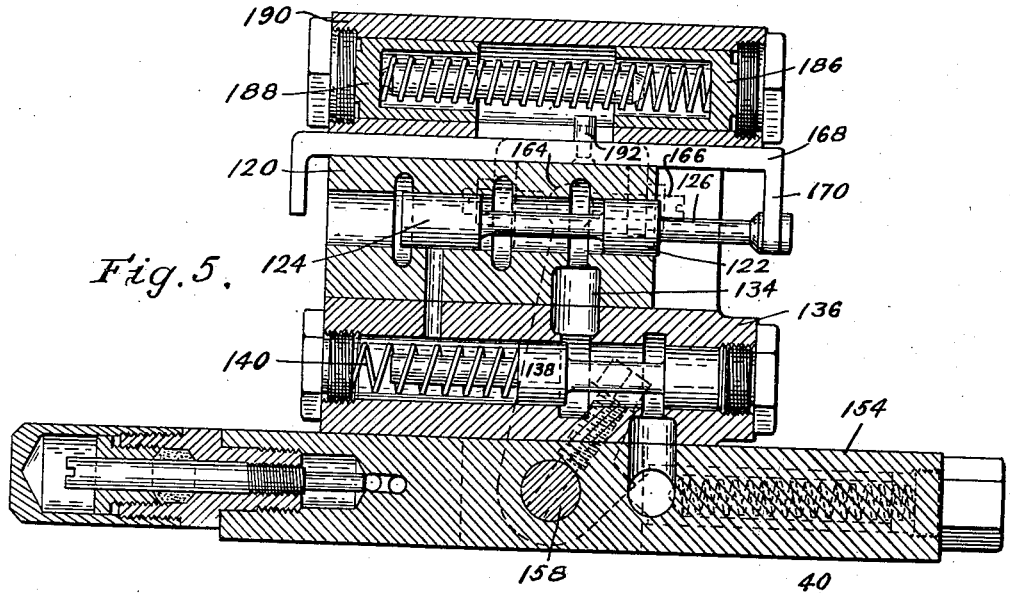
Fig. 5.
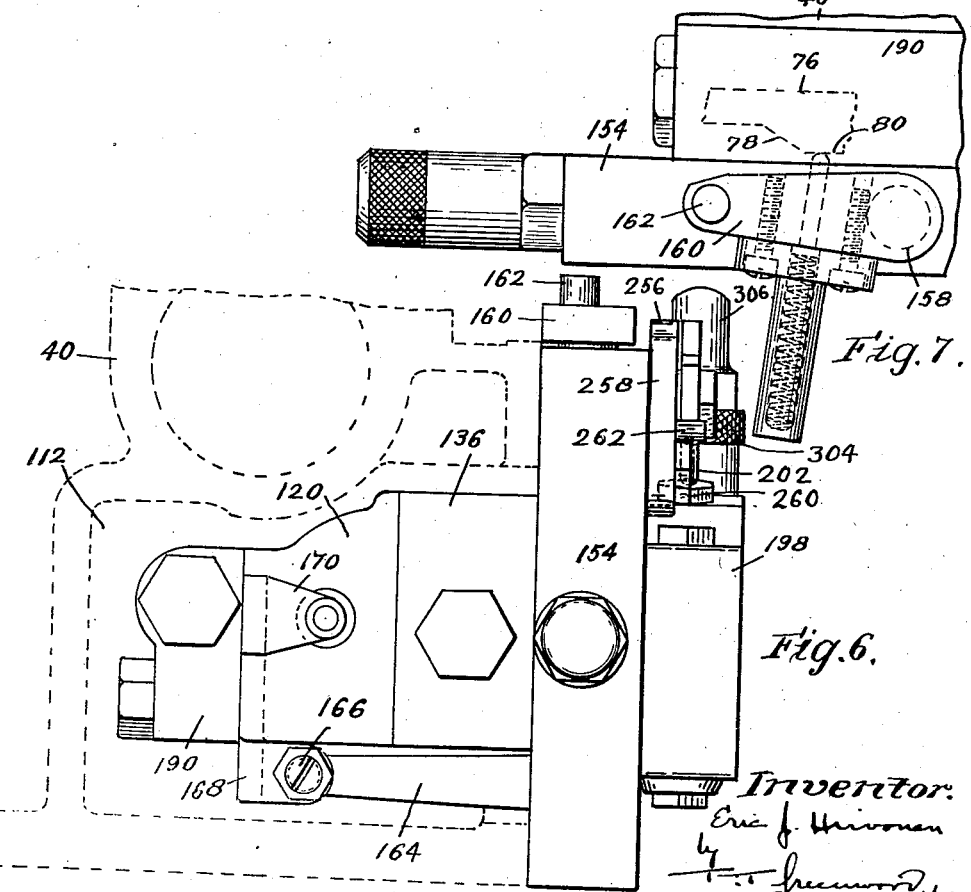
Fig. 7.
Fig. 6.
Inventor:
Eric J. Hirvonen March 9, 1937.    E. J. HIRVONEN    2,073,518
HYDRAULIC MACHINE TOOL
Filed Oct. 8, 1932    6 Sheets-Sheet 6
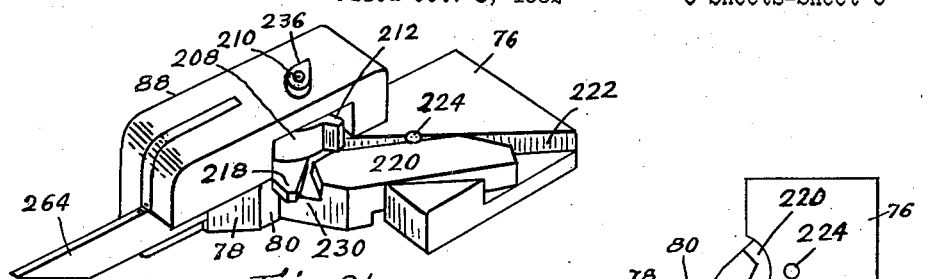
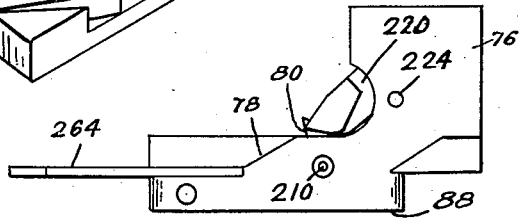
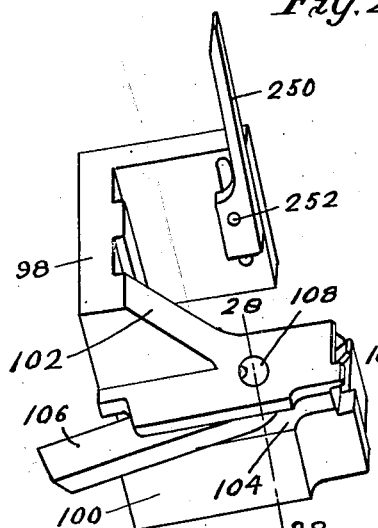
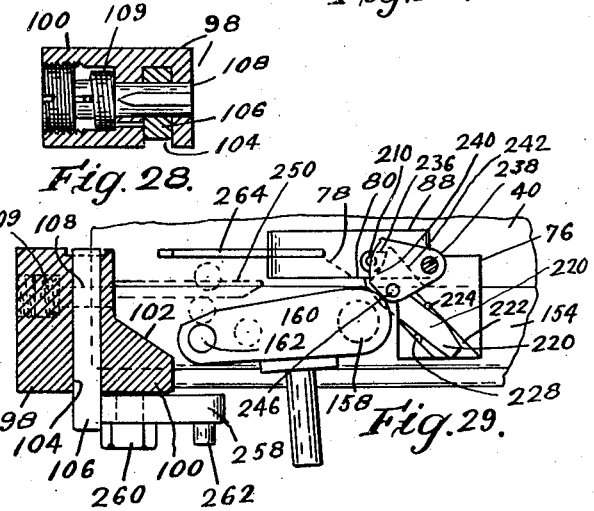
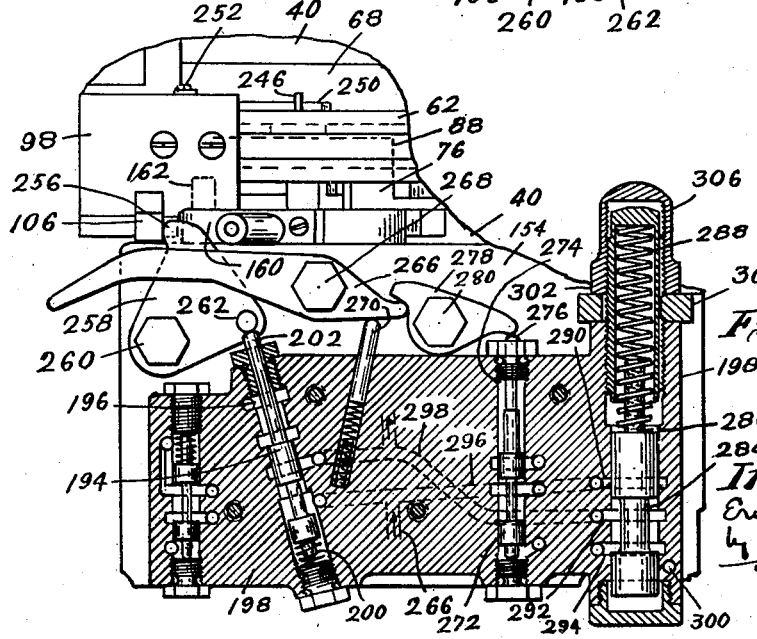

Patented Mar. 9, 1937

2,073,518

UNITED STATES PATENT OFFICE 2,073,518

HYDRAULIC MACHINE TOOL

Eric J. Hirvonen, Worcester, Mass., assignor to Leland-Gifford Company, Worcester, Mass., a corporation of Massachusetts Application October 8, 1932, Serial No. 636,855

66 Claims. (Cl. 77—32)

This invention relates to machine tools and has particular reference to drilling machines and the like wherein the cutting tool is advanced toward and retracted from the work by hydraulic mechanism.

One of the objects of the present invention is to provide a machine tool, as a drill, with means for keeping the tool in engagement with the work as continually as possible and providing that the periods of time during which the tool must be necessarily free from the work shall be of minimum duration.

In drilling holes, for instance, it is now the practice to advance the drill rapidly to the surface of the work and then to advance the drill at a slower rate in engagement with the work; and also to retract the drill rapidly away from the work. In drilling deep holes it is necessary frequently to withdraw the drill from the hole in order to remove the chips so that the drill can cut smoothly, rapidly and accurately. It is an object of the present invention to provide automatically operative mechanism for retracting the drill out of the work sufficiently to clear the chips after cuts of predetermined depth have been made and then to advance the drill automatically again into engagement with the work.

It is a further object of the invention to provide automatically operative means for retracting the drill rapidly out of the hole and for advancing the drill rapidly for successively greater distances into the hole down to the bottom of the successive depths so that the drill is out of engagement with the work only for minimum intervals.

Another object is to cause the automatic retraction and advance of the tool where the pressure thereon exceeds a predetermined amount, for the purpose of clearing the tool of chips.

A further object of the invention is generally to improve upon machine tools and methods.

Fig. 3 is a plan view of the mechanism of Fig. 2.

Fig. 5 is a sectional elevation of the hydraulic valve assembly, the outermost valve plate being removed, and the section being taken through the assembly along line 5—5 of Fig. 2.

Fig. 6 is an end elevation of the valve assembly in position within the mechanism frame, which frame is illustrated in dotted lines.

Fig. 7 is a plan detail of the valve supporting plate and illustrating particularly the cam controlled speed controlling and reversing member.

Figs. 9 through 14 are diagrammatic views illustrating the relation between the various fast and slow advancing and retracting movements of the drill in relation to the work, in accordance with the present invention.

Fig. 15 is a detailed end view of the cam slide of Fig. 3.

Fig. 16 is a sectional detail taken along line 16—16 of Fig. 3.

Fig. 17 is a view of the reversing block taken along line 17—17 of Fig. 15.

Fig. 18 is a plan view of the mechanism that controls the successively increased amounts of advance of the tool.

Fig. 19 is a view generally similar to Fig. 18 but illustrating the mechanism in position to effect the reverse movement of the tool.

Fig. 20 is a view similar to Fig. 18 but illustrating the position of the mechanism with respect to the control dog of Fig. 18 for the second advance movement of the tool, Figs. 18, 19 and 20 being successive positions of the mechanisms for successive advances of the tool.

Fig. 21 is a perspective view of the cam mechanism of Figs. 18 and 19.

Fig. 22 is a bottom view of the mechanism of Fig. 21.

Figs. 23, 24 and 25 are similar diagrammatic views taken generally along the line 23—23 of Fig. 16 and illustrating successively advanced positions of the cam slide for obtaining successively advanced positions of the tool.

Fig. 26 is a sectional detail taken along line 26—26 of Fig. 3 and illustrating some of the control valves and parts.

Fig. 27 is a perspective view of the reversing block illustrated in Fig. 17.

Fig. 28 is a section taken along line 28—28 of Fig. 27 and illustrating the construction of the spring-biased pivot pin for the latch of the reversing block.

Fig. 29 is a plan detail of the reversing mechanism taken generally along line 29—29 of Fig. 2.

Figure 1:
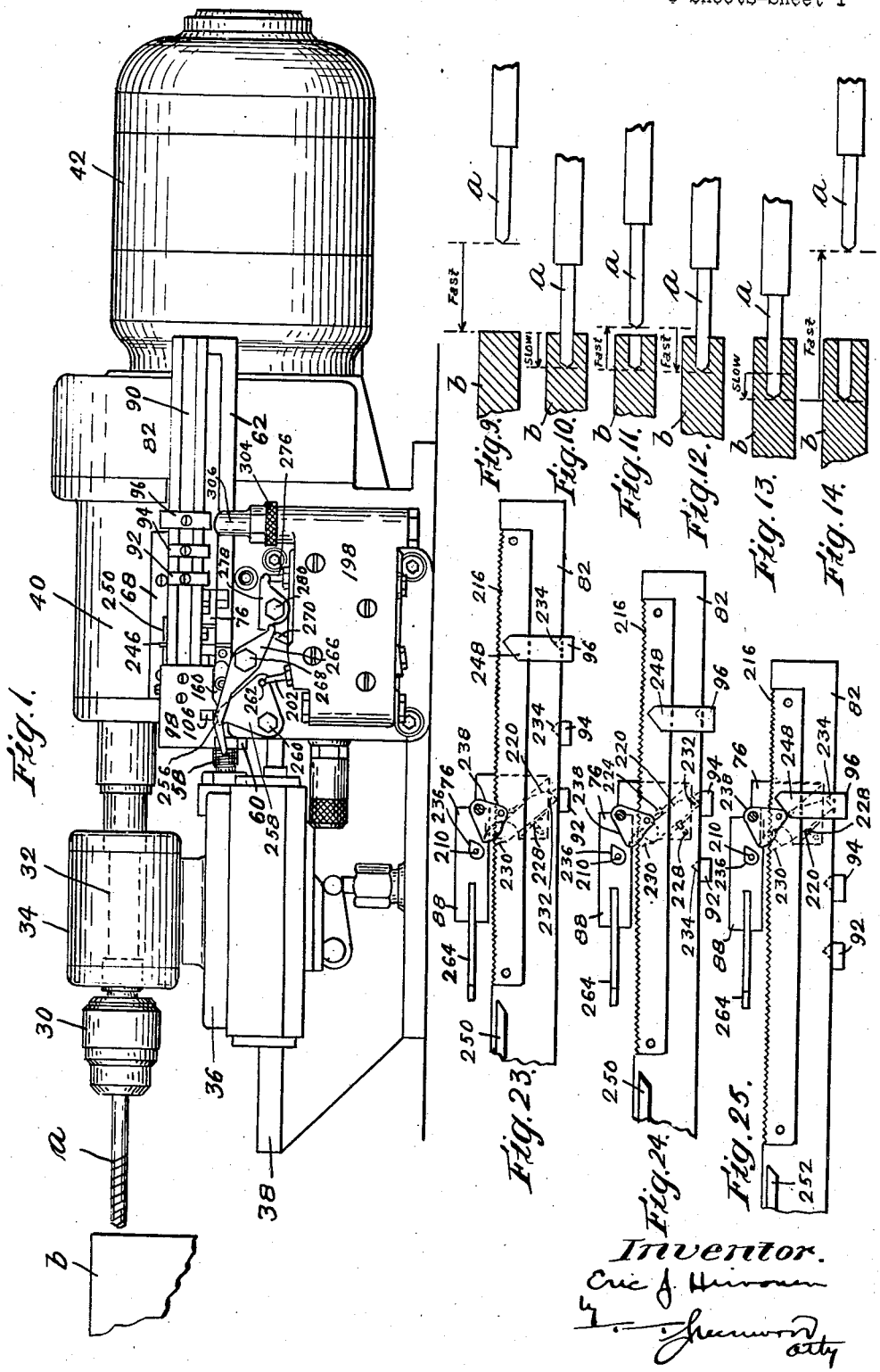
Fig. 1 is a front elevation of a drilling machine embodying the present invention.
Figure 2:
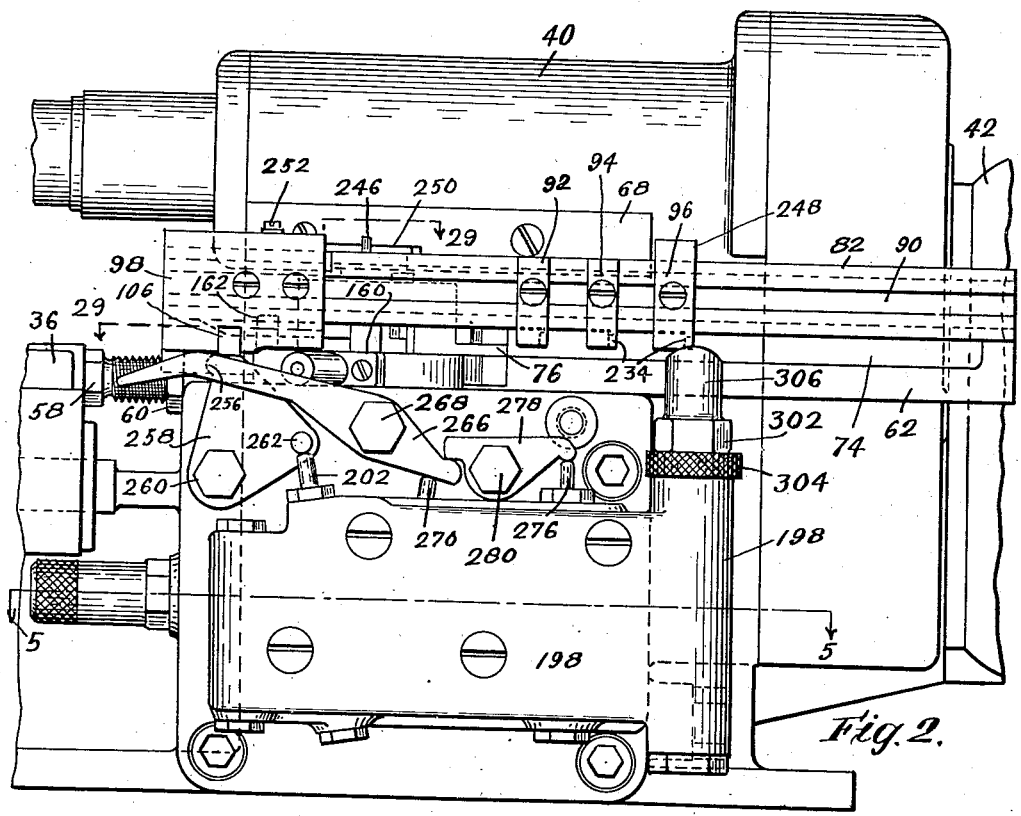
Fig. 2 is an enlarged front elevation of the control mechanism of Fig. 1.
Figure 4:
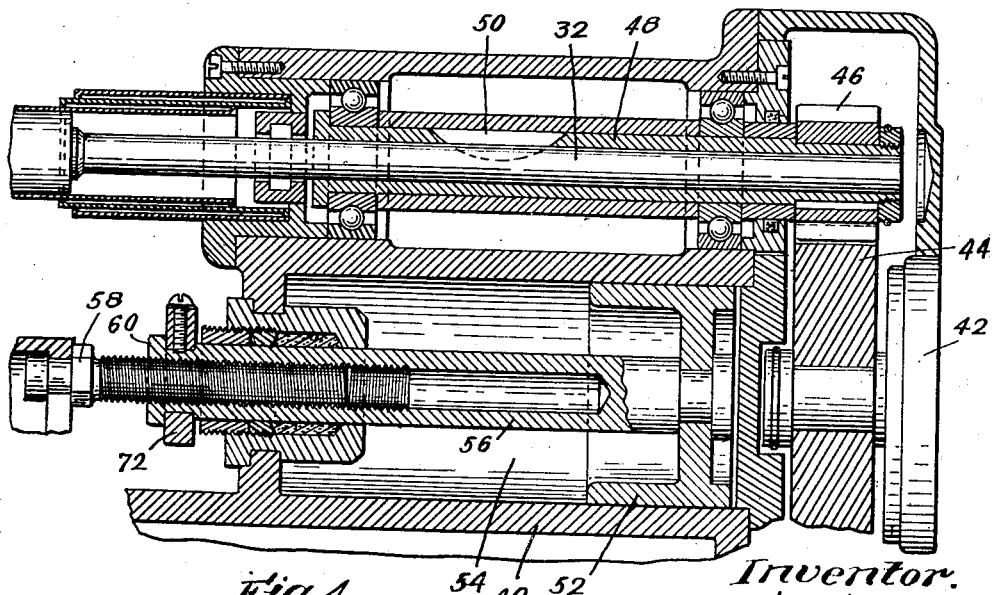
Fig. 4 is a detailed sectional elevation taken through the hydraulic cylinder and spindle drive shaft of Fig. 1 along line 4—4 of Fig. 3.

The hydraulic tool involving the present invention comprises a drilling machine having a drill, a, Fig. 1, which is adapted to drill a hole in the work b. The drill is carried by a chuck 30 fixed to a shaft 32 journalled in a bearing block 34 carried by a slide 36 that is slidable axially of the drill shaft 32 on a guideway 38 that is a part of the general frame 40 of the unit, the unit being adapted for support on some convenient base. A motor 42 is carried by the frame 40 and drives a gear 44, see Fig. 4, which meshes with a pinion 46 fixed to a tubular driving shaft 48 within which the spindle 32 is slidable and to which the spindle is keyed for conjoint rotary motion therewith by a suitable key 50. The slide 36 is reciprocated hydraulically by a piston 52 disposed in a cylinder 54 formed integrally with the general frame 40 beneath the spindle and its driving shaft. The piston 52 has a piston rod 56 which has internally screw-threaded engagement with a co-axially disposed rod 58 connected with the slide 36 so that the piston and slide are caused to reciprocate as a unit. The piston rod 56 and screw-threaded rod 58 are held locked in any adjusted position by a lock nut 60. The piston is reciprocated by the admission of pressure liquid alternately on opposite sides thereof; and the movements of the piston are controlled by a cam slide 62, see Figs. 1, 2, 3, 5, 15, and 16. Said slide includes a generally flat longitudinally extended slide bar 64 that is slidable in a horizontal groove 66 of the frame 40 behind a plate 68 which is secured to the frame 40 and overlies the upper portion of the front face of the bar and retains the bar in the groove. A bracket 70, see especially Figs. 3 and 15, is secured to the forward edge of said bar 64 and has a boss 72 which encircles the forward edge of the piston rod 56 behind the lock nut 60 so that the slide bar and the piston reciprocate together. Said bar 64 has a longitudinal groove 74 in its outer face in which a cam block or control member 76, see especially Figs. 2, 16, 18, 19, 20 and 21, is slidably retained. Said cam block has an inclined cam face 78 which leads to a flat or dwell face 80 for giving a slow speed advance of the piston and the connected tool. The cam block 76 is movable toward the left along the slide bar 64 a predetermined distance or, more accurately, the slide bar 64 moves, while the cam block 76 is held stationary, during each successive advance of the slide bar and the tool in a manner hereinafter to be explained for the purpose of effecting a following further advance of the tool each time it is reciprocated, until a predetermined advanced position of the tool has been reached. The slide bar 64 has a horizontal forwardly extended bar 82 secured to it at its ends by screws 84 and having a groove 86 which confronts the groove 74 in said slide bar and in which groove 86 the vertical plate 88 of said cam block 76 is movable. The outer horizontal face of said block 82 is provided with a longitudinal T slot 90 by means of which a plurality of similar reversing dogs 92, 94 and 96, see especially Figs. 2, 3 and 16, are secured in any suitable longitudinally disposed location on said bar. Said dogs cooperate with said cam block 76 in a manner presently to be described. A cam block 98, see Figs. 1, 2, 3, 15, 17, 26 and 27 is secured adjustably on said bar 82 at or near the forward end thereof and has means adapted to effect the advancing movement of the piston and tool after it has been retracted from some intermediately advanced position and also to hold the piston and tool in a completely retracted position after it has been retracted from a fully advanced position or has been retracted during an intermediate part of the cycle. Said cam block 98 is provided with a plate 100 which underlies the bar 82 and said plate has a rearwardly-directed inclined cam face 102, see especially Fig. 29, that is adapted to effect the positioning of the piston and tool in a fully retracted and neutral position. The plate 100 also has a transverse vertical slot 104 therein, see especially Figs. 15, 17 and 27, in which a valve controlling latch lever 106 is vertically movable on a pivot 108, the lever being normally biased for movement in a counterclockwise or downward direction when viewed as shown in Fig. 27 in a depressed position by a spring 109, see Fig. 28. Said lever 106 serves to effect the advance of the piston after it has been retracted from some intermediately advanced position.

Figure 8:
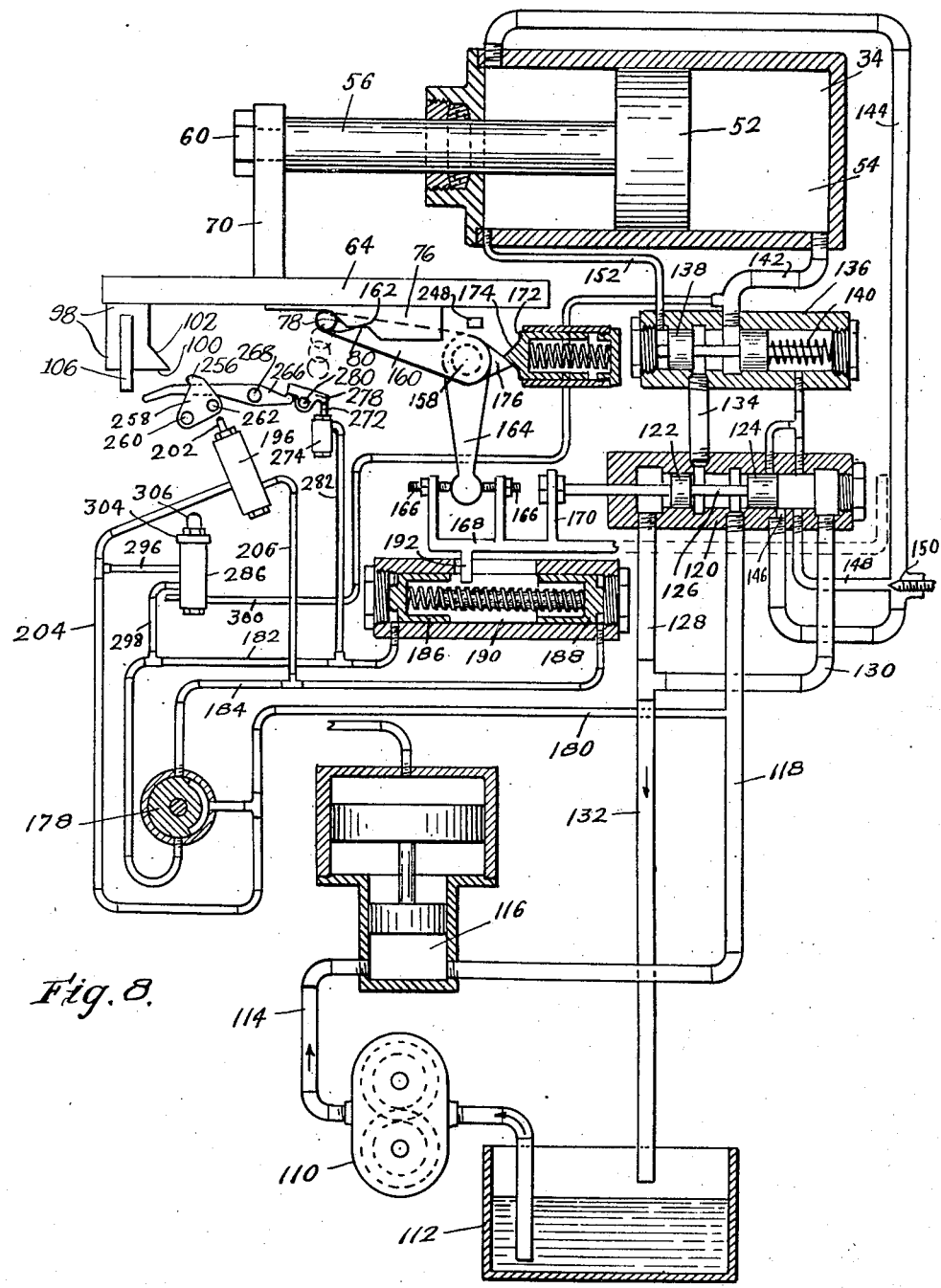
Fig. 8 is a diagrammatic view of the more essential parts of the apparatus and the hydraulic system associated therewith.

The movements of the piston are controlled by hydraulic valves which, in addition to manual operation by which the advance of the piston can be started and the piston can be returned to fully retracted position at any time under control of an operative, are operated automatically by the aforesaid cams 78, 102, and the lever 106 to effect the desired control of the mechanism. The valves and the hydraulic system associated with the present apparatus are illustrated in Fig. 8 and will now be described. The hydraulic system includes a continuously operating oil pump 110 preferably, although not necessarily, of the gear type which receives oil from a reservoir 112 and forces it through a pipe 114 into the cylinder of a compressed air accumulator 116 from which the oil flows through a pipe 118 into a valve 120 having the piston valves 122 and 124 therein connected together by a valve stem 126. The opposite ends of the valve cylinder are connected by pipes 128 and 130 to a pipe 132 which conducts exhaust oil back into the reservoir 112. A pipe 134 is in communication with an intermediate part of the valve cylinder and also with a piston-speed controlling valve cylinder 136 that has the piston valve 138 therein which is acted upon by a spring 140 to urge the valve constantly toward the left. A pipe 142 communicates with an intermediate part of the valve cylinder 136 and also with the rear or right hand end of the piston cylinder 54. A pipe 144 communicates with the forward or left hand end of the cylinder 54 and with a port 146 in the valve cylinder 120. In Fig. 8 the parts are set for a fast forward feed of the piston and tool, the valves 122, 124, and also the piston-speed control valve, being at the extreme left. The high pressure oil from the pipe 118 passes unthrottled through the valve cylinders 120 and 136 into the rear end of the cylinder 54 behind the piston 52 and thereby advances the piston at maximum speed, the oil in front of the piston escaping through the pipe 144 into the right hand end of the valve cylinder 120 and through the pipe 130 back into the reservoir 112. The piston 52 is also adapted to have a slower rate of advance in which case the piston valves 122 and 124 are moved sufficiently to the right to close the exhaust port 146 and also partially to close the outlet port communicating with the pipe 134. The oil escaping from the forward end of the piston is now constrained to pass into the exhaust end of the valve cylinder 120 through a pipe 148 which communicates with the pipe 144 through a throttle valve 150, which throttle valve retards the flow of oil and thereby sets up a back pressure oil on the piston 52 and holds the piston against jumping due to variable resistance between the work and the tool operated by the piston. The back pressure oil operates on the piston of the valve 138 through the pipe 152 to advance the valve 138 against the action of the spring 140 toward the right into some position where it partially closes the inlet port communicating with the inlet pipe 134 thereby partially throttling the oil supply to the rear end of the cylinder. Since the back pressure of oil in the forward end of the cylinder is variable due to variable resistance between the tool and the work the valve 138 is caused to assume various throttling positions which vary the rate of inflow of oil behind the piston sufficiently to maintain a constant rate of advance of the piston regardless of a variable loading thereof.

The valves 122 and 124 can be advanced further toward the right to completely close the outlet connected with the pipe 134 and also the exhaust port 146 and the outlet of the pipe 148 thereby preventing flow of oil into and out of both sides of the piston and holding the piston 52 immovably in any position in which it may have been moved. A movement of the valves 122 and 124 further toward the right places the pipe 134 in communication with the exhaust pipe 128 and the pressure pipe 118 in communication with the pipe 144 thereby supplying high pressure oil to the forward end of the piston cylinder 54 and establishing an unrestricted exhaust passage for the rear end of the cylinder so that the piston 52 is retracted at a rapid rate. The valve cylinders 120 and 136 are secured one against the other to the inner face of a valve supporting plate 154 which is bolted over a recess 112 in the frame 40 of the mechanism, see Figs. 5 and 6, which recess comprises the oil reservoir of the system. The valves 122, 124 are operated by a valve operating member comprising a shaft 158 which has an arm 160 fixed to its upper end, the arm having an upstanding cam pin 162 that is disposed in position to be engaged by the cam blocks 76 and 98, said arm overlying the top of the valve supporting plate 154 and being disposed in front of the slide 64. A rearwardly extended arm 164 is fixed to the lower end of said shaft 158 and has its end terminated between longitudinally adjustable screws 166 carried by a slide 168 located in a groove in the valve cylinder 120 and having an arm 170 that is connected to the stem 126 of said valve so that said slide and valve stem are caused to move together. The position of said arm 160 thus determines the operative condition of the piston 52. When the arm 160 is in the position illustrated in Fig. 8 with its pin 162 disposed in front of but out of engagement with the cam block 76, the valves are in condition for a rapid advance of the piston 52. When the pin 162 is on the dwell portion 80 of the cam block 76 the setting of the valves is such as to give a slow or working advance of the piston. When the pin 162 is in the next advanced position, away from the dwell portion 80 and engaged by the cam face 102 of the block 98, the valves are in neutral position and the piston 52 is stationary. When the pin 162 is in the fourth position illustrated by the dotted lines, Fig. 8, the mechanism is set for a fast return of the piston 52. The arm 160 is held either in high or slow speed advance positions or in reverse position by means including a spring pressed plunger 172 that has a triangular cam projection 174 that abuts against a similar cam projection 176 fixed to the shaft 158. The arrangement of said cam projections is such that their apexes coincide somewhere between neutral and slow speed positions of the arm 160 so that when the cam projections are in the position illustrated in Fig. 8 the arm 160 is biased toward a high speed position and when the cam projection 176 is on the other side of the cam projection 174 the arm 160 is biased toward reverse. The arm 160 must be held in neutral position against the action of the plunger 172 and this is done by engagement of the pin 162 with the cam 102 of the cam block 98 at the time the piston 52 is in fully retracted position.

When the piston 52 is in fully retracted position it can be started in a forward direction under manual control and also can be returned to fully retracted position in any part of its working cycle also under manual or other control. This is accomplished by a manually or otherwise operated three-way valve 178, diagrammatically shown in Fig. 8, which admits pressure fluid from a pipe 180 communicating with the pressure pipe 118 alternately into the pipes 182 and 184 which admit pressure oil behind the spring pressed pistons 186 and 188 operating in the cylinder 190. Said pistons are movable into engagement with a pin 192 carried by the valve slide 168 and are arranged to move said valve slide and the arm 160 in opposite directions. When the piston 52 is in a retracted position less than its fully retracted position but sufficiently to clear the drill from the work, in an intermediate part of its cycle of operations, the piston is adapted to be reversed and advanced by the operation of a piston valve 194 operating in a cylinder 196, see Figs. 8 and 26, carried by a valve block 198 secured to the outer face of the valve carrying plate 154. Said valve 194 is normally biased by a spring 200 into a closed position but, when the valve stem 202 is depressed the valve is adapted to admit pressure fluid to flow from the pipe 204 through the pipe 206 and into the pipe 184 thereby to move the piston 188 and cause the reversal of the valves 122, 124, the arm 160 and the piston 52. Many of the actual piping connections of the parts illustrated in Fig. 8 have been omitted or modified to aid in a clearer understanding of the invention. For instance, fluid passages here shown as pipes, such for instance, as exhaust pipes 128, 130 are not actually as shown, the exhaust ports of the valves merely discharging into a space which is above the oil reservoir 112 that is located in the bottom of the frame 40 of the mechanism.

It will now be understood that the piston 52 can advance at a rapid rate until the pin 162 rides upon the dwell portion 80 of the cam block 76 whereupon the piston advances at a slower speed until the arm 160 is moved into a reversed position whereupon the piston retracts rapidly until the pin 162 is engaged by the cam 102 and is moved into and held in neutral position whereupon the piston 52 is held stationary in fully retracted position. In accordance with this invention the piston 52 and the tool associated therewith are required automatically to make a plurality of high speed and low speed advancing movements into successively advanced positions and alternated with retracting movements to the same position and terminated with a retracting movement to a further and fully retracted position. The nature of this work requiring these operations is best illustrated in Figs. 9 through 14. Fig. 9 represents the initial position of the work b and the drill a at the beginning of a cycle. The drill a is required to advance at a fast rate up to the surface of the work b and then to advance at a slow rate into the work to some position shown in Fig. 10 from which position the drill is retracted rapidly into the position as illustrated in Fig. 11, where the drill is sufficiently clear of the work so that the chips can fall away from the drill and permit the drill point to be bathed in the coolant that is customarily flowed upon the surface of the work at the mouth of the hole whereby to cool the drill point and present it from overheating and losing its cutting edge. The drill is then desired to be advanced rapidly to the bottom of the hole into the position illustrated in Fig. 12 and then further into the work at slow speed into some position as illustrated in Fig. 13. The drill is then required to be retracted into the position illustrated in Fig. 11, if the hole is not yet deep enough, and then advanced again in the manner illustrated in Figs. 12 and 13 or, if the hole is deep enough, to be retracted into the final position illustrated in Fig. 14. These results are accomplished by holding the cam block 76 stationary when it is in slow speed engagement with the pin 162 of the arm 160 so that the slide 64, which moves with the drill, can move the required distance without carrying the cam block with it. When this distance is reached the cam block is caused to move with the slide and throw the valve controlling arm 160 into reverse position so that the tool and the slide and the cam block are retracted as a unit and then advanced with the cam block in a different position on the slide. To accomplish these results the cam block 76 is provided with a pawl 208, see Figs. 2, 16, 18, 19, 20, 21 and 22, which pawl is journalled on a shaft 210 carried in the upstanding part 88 of the cam block. The pawl 208 has a tooth 212 which is biased by a spring pressed plunger 214, see especially Figs. 18 and 19, in constant engagement with the teeth of a rack 216, which rack is located under the bar 82 of the slide bar 64 with its teeth confronting and about in line with the bottom of the groove 86 in said bar 82. Thus the pawl 208 until released holds the cam block 76 against movement to the right on the slide bar 64 while permitting it freely to move toward the left or, rather, permitting said slide bar to move toward the right while the cam block is held stationary. The pawl 208 is also provided with a tooth 218 which is disposed at the rear of and projects beyond the dwell portion 80 of the cam block and is adapted to be engaged by the pin 162 of the valve control arm 160 for moving the tooth 212 out of engagement with the rack. Thus, as the slide bar 64 advances with the drill, the cam block 76 is locked to the slide bar and advances therewith until the cam 78 moves under the pin 162 of the valve control arm and causes the pin to ride onto the dwell portion 80 of the cam block so as to cause the speed of advance to be reduced. Further forward movement causes the tooth 218 of the pawl 208 to be engaged by the pin 162 and the pawl rotated in a counterclockwise direction to free the cam block from the rack 216 so that the slide and the tool can continue to advance at slow or working speed while the cam block remains stationary, the block being held stationary by the pin 162. After a certain amount of slow speed advance has been accomplished or when the tool is in the position illustrated in Fig. 10 and it is time to clear the tool of chips the cam block is arranged to be connected with the slide bar and to move forwardly therewith and during such movement to trip the valve controlling lever 160 or to throw it into reverse position so as to cause the retraction of the piston and the tool. This is accomplished by the first of the dogs 92, 94 and 96 fixed to the slide bar and which engage a rocking plate 220 which is capable of rocking and also moving longitudinally in a horizontal groove 222 formed in the horizontal face of the cam block 76. Said block is provided with an upright cylindrical pin 224 that is located at least partly within the slot 222 and provides a support for the inner horizontal face of the rocking plate and on which said plate can rock. A spring pressed plunger 228 engages the opposite face of the rocking plate forwardly of the pin 224 and holds the plate against the pin and also urges it constantly for rotation in a counterclockwise direction. The forward inner end of the rocking plate is provided with an inclined face 230 which is located under the tooth 218 of the pawl 208 and slightly to the rear thereof and over the dwell portion 80 of the cam block 76. The opposite outer end of the rocking plate is provided with an abutment face 232 that is normally within the groove 222 or at least in an inoperative position but is arranged to be disposed beyond the end of the groove and in position to engage in succession a projection 234 of any one of the several dogs 92, 94 and 96 in the manner illustrated in Fig. 19. The arrangement is such that when the pin 162 of the valve controlling arm 160 is on the dwell portion 90 of the cam block and is in engagement with the tooth 218 of the pawl 208 so that the cam block is free from engagement with the rack 216, the pin 162 is also in engagement with the cam face 230 of the rocking plate 220, thereby holding the abutment end 232 of the rocking plate in the position illustrated in Fig. 19 where the dog 92 can ultimately engage the end of the rocking plate and thus, upon further movement of the slide, advance the cam block 76 with the slide. When this occurs the inclined face 230 of the rocking plate cams the pin 162 outwardly and thus causes the valve control lever 160 to throw into reverse position thereby effecting the retraction of the mechanism. The movement of the pin 162 into reverse position and away from holding engagement with the pawl 208 permits the pawl to rotate in a clockwise direction to position its tooth 212 into engagement with the rack 216. The movement of the pin 162 into reverse position also permits the spring pressed plunger 228 to rotate the rocking plate 220 in a counterclockwise direction to free it from the dog 92 and to lie clear of and behind or to the rear thereof so that on the next similar movement it will repeat the just described operation with the next dog 94. The cam block 76 will thus have been shifted from the initial position illustrated in Fig. 23 to that shown illustrated in Fig. 24. When the mechanism again advances with the cam block in its displaced position toward the right it is apparent that the mechanism must advance a greater distance than before in order to bring the cam block 76 into position to again engage the pin 162 of the valve control arm and to move it into slow speed position. This position will correspond with the position of the tool illustrated in Fig. 12. When the cam block has moved to position dwell portion 80 under the pin 162 the mechanism will continue to advance but at a slow speed, with the cam block being held stationary by the pin 162 until the rocking plate engages the second dog 94, or when the drill is in the position illustrated in Fig. 13. The mechanism is then again reversed and a similar advancing action will take place with the cam block in a further displaced position toward the right until the third cam dog 96 is engaged by the rocking plate. The number of dogs 92, 94, 96 govern the number of reciprocations prior to the stopping of the mechanism in fully retracted position; and the distance between the successive cam dogs determines the amount of slow speed advance of the mechanism.

The clearance between the drill and the bottom of the hole at the end of the rapid advance stroke and the beginning of the slow advance or feed stroke is regulated by the adjusting screws 166, see Fig. 8, which screws vary the position of the pin 162 of the arm 160 on the inclined face of the cam 78 at which the valve pistons 122, 124 are shifted and thereby shifts said valve pistons into slow speed position earlier or later, depending upon the setting of the screws.

When the mechanism is retracted the last time and moved into final fully retracted position it is desirable automatically to return the cam block 76 to its initial or starting position with respect to the slide bar 62 so that the mechanism can start on a second cycle without the necessity for manually resetting the parts thereof. This is accomplished in the following manner:

The cam block 76 is provided with a projection 236 which upstands above the vertical portion 88 of the cam block and in this instance comprises the upstanding end of the shaft 210 for the pawl 208, said projection being disposed under the plate 68, see Fig. 16, and in the longitudinal groove 86 of the slide bar 62. The plate 68 is provided with a pivoted pawl 238, see Figs. 3, 16, 22, 23 and 24, which overlies the portion 88 of the cam block and has an abutment 240 which is disposed in the path of movement of the projection 236 of the cam block. When the pawl 238 has been rotated in a clockwise direction it has a relieved portion 242 under which the projection 236 of the cam block can pass when the pawl 238 has been rotated in a counterclockwise direction. A spring pressed plunger 244, see Fig. 3, is in engagement with the pawl 238 to hold it releasably in either one of its two positions. The pawl 238 is provided with an upstanding pin 246 which overlies the vertical face of the plate 68 and forms means by which the pawl is moved into or out of projection engaging position. During the times that the mechanism is making its intermediate reciprocating movements the pawl 238 is adapted to be in a projection-free position, as illustrated in Figs. 3, 23 and 24. After the final working stroke of the mechanism has been made, however, and the cam block 76 is to be returned to its initial or starting position the pawl 238 is moved to its inner or holding position. For this purpose the last dog 96 of the series is provided with a cam projection 248, see Figs. 3, 23, 24, 25 and 29, which overlies the top face of the bar 82 and is disposed into position to engage the pin 246 and move the pawl 238 inwardly behind or at the right hand side of the projection 236. With the pawl 238 in this position, when the slide 62 is retracted, the cam block 76 is held stationary and thus the slide bar is retracted without a corresponding movement of the cam block so that the cam block is restored to its starting position on the slide bar. The cam block is adapted to be free to move relatively to the slide bar when the mechanism is again started off on a new cycle and hence the pawl 238 is moved out of holding engagement with the projection 236 of the cam block during the final retracting movement of the mechanism. This result is accomplished by means of a cam plate 250 which is longitudinally adjustably secured to the cam block 98, see Fig. 3, by a clamping screw 252 that is positioned in a longitudinal slot 254 of said cam block. The cam plate 250 is provided with an inclined forward end that is moved under the pin 246 of the pawl 242 during the latter part of the final retracting movement of the mechanism and thereby causes the release of the cam block 76 so that it is conditioned for a succeeding cycle of operation.

At the end of each intermediate return or retraction movement of the mechanism into an intermediate retracted position, as illustrated in Fig. 11, the mechanism is adapted automatically to be again advanced. This advancing movement, as has been stated heretofore, is controlled by the lever 106 that is pivoted to the cam block 98. The forward end of said lever 106 is normally held by a spring 109, Fig. 28, in a depressed or lowered position in which it is arranged to engage an abutment 256, see especially Figs. 2, 6 and 26, of a plate 258 pivoted at 260 to the valve supporting plate 154. Said plate at the end opposite the abutment 256 carries an outstanding pin 262 that, when the plate 258 is rotated by the lever 106 in a clockwise direction, is arranged to engage the end of the stem 202 of the reversing valve 194, see Fig. 8, thereby reversing the movement of the mechanism and again advancing it. This operation of the valve 194 can take place as often as there are intermediate retracting steps of the working cycle. At the time the final retracting movement takes place, however, and wherein the mechanism is adapted to be held stationary until started in operation on another cycle by hand or other external control, the lever 106 is arranged to be elevated so that it rides over the plate 258 without rotating it. This operation is effected by the cam block 76. Said cam block has a cam plate 264, see especially Figs. 21 and 29, which projects forwardly from the cam block and into position to engage and ride over the inner end 106a of the lever 106. During the intermediate reciprocatory movements of the mechanism the cam plate 264 is always so far away from the end of the lever 106 that it can not engage it. When, however, the mechanism is making its final retracting movement the position of the cam block 76 is such that the inner end of the lever 106 is caused to ride under and be depressed by the cam plate 264, this occurring prior to what would be the normal engagement of the lever with the valve operating plate 258. Hence the outer end of the lever is caused to be raised above said plate 258 and ride thereover, in the manner illustrated in Fig. 2, without actuating the plate and the valve associated therewith. This further movement of the mechanism is sufficient to bring the cam face 102 of the cam block 98 into engagement with the pin 162 of the valve control lever 160 and to move it into neutral position thereby to cause the mechanism to remain stationary in fully retracted position until the mechanism is again advanced on a new cycle by the operation of the hand or otherwise controlled valve 178 of Fig. 8.

It is desirable, for many purposes, to enable the tool to be withdrawn to its fully retracted position at any part of its cycle of operation, either by manual or other control and independently of the work-cycle controlling mechanism. This is effected by holding the latch or lever 106 in an elevated position at the time the tool is moving rearwardly, so that the lever can not operate the reversing valve and hence the mechanism is caused to be carried into and stop at the fully retracted position thereof. The lever 106 is elevated by a lever 266, see Figs. 2, 3 and 26, that is pivoted intermediate its ends on a stud 268 carried by the plate 154 and has a forwardly extended part or tail that underlies the lever 106 and, when elevated, is adapted to engage and elevate said lever above the valve actuating plate 258, so that the mechanism can be carried into a fully retracted position. The tail of the lever 266 is normally held in a depressed position by a spring pressed plunger 270 in the plate 198 and which presses against the lever on the other side of the pivot thereof. The lever 266 is arranged to be operated through a hydraulic piston 272 operating in a cylinder 274 of the plate 198 and having a stem 276 that is disposed under one end of a lever 278 pivoted on the stud 280, the other end of which lever engages the first lever 266. The arrangement is such that when the piston 272 is forced upwardly by oil pressure, the lever 278 operates the lever 266 to raise the latch lever 106. The lever 278 is biased by a spring, not shown, for rotation in a clockwise direction, Fig. 26, or toward an unoperated position, thereby urging the piston 272 toward the bottom of its cylinder 274. The cylinder 274 is arranged to receive pressure oil, thereby to raise the latch lever 106, at the time the piston controlling valve is shifted into reverse position by the operation of the manually or otherwise controlled valve 178, Fig. 8, and hence said cylinder is connected by a pipe or duct 282 with the pipe or duct 182, so that the mechanism is conditioned at the same time for reverse movement and for movement into fully retracted position.

It occasionally happens that a chip lodges under the cutting edge of the drill and rotates therewith and prevents the drill from cutting and thereby advancing. In this event, the back pressure on the piston drops and causes a greater piston-advancing pressure to be built up on the other side of the piston. Hence the pressure on the drill becomes greater and the drill may break. Mechanism is provided to prevent the application of too much pressure on the drill and, when the pressure exceeds a predetermined amount, to retract the drill from the work so as to clear the chip from under the cutting edge of the drill, and then to return the drill into the work. If the drill is unable to cut, due to the continued presence of the chip or for other reasons, the drill is caused to be automatically retracted and advanced until the conditions causing the high pressure on the drill, or other tool, have disappeared, whereupon the normal cycle of operation will be resumed. The arrangement is such that the retracting movement due to the high drill pressure does not advance the cycle of operation, that is, the retraction of the drill does not cause the cam block 76 to be shifted along its slide. The mechanism for effecting the retraction of the tool from the work due to a high pressure on the tool includes a piston valve 284, see Figs. 26 and 8, located in a cylinder 286 of the plate 198 and urged by a spring 288 into a lowermost position where it closes the high pressure port 290 and opens the reversing port 292 and the exhaust port 294. The high pressure port is connected by a pipe or duct 296 with the full high pressure source. The port 292 is connected by a pipe 298 to admit high pressure behind the reversing piston 186 so as to effect the retraction of the tool. The space under the piston valve 284 is connected by a duct or pipe 300 with the pushing side of the piston 52 and is at all times subjected to the oil pressure on the piston. Under normal working conditions the spring 288 holds the piston valve 284 in its lowermost position, so that high pressure oil is isolated from the reversing piston 186. When, however, the oil pressure on the pushing side of the piston 52 becomes excessively high, as when a chip becomes lodged under the cutting edge of the drill, or when the drill becomes dull, the pressure through the pipe 300 overcomes the spring pressure and raises the piston valve and thus establishes full oil pressure on the reversing piston 186, which then operates to reverse the valve mechanism of the piston 52 and effect the retraction of the piston at high speed. The piston and tool retract until the tool is clear of the work or into some position as shown in Fig. 11, at which position the latch lever 106 depresses the advancing valve 194 and reverses the position of the aforesaid valve mechanism and hence causes the tool to advance as before, that is, first rapidly down to the original point of engagement of the tool and the work and thence slowly. The tool will automatically retract and advance in the aforesaid manner until the chip has been cleared or until the apparatus is retracted into fully retracted and neutral position by an operative. The automatic reciprocation of the tool under control of the excess pressure valve 284 takes place between positions of the tool that cause changing of the lengths and rates of advance and hence does not change the position of the cam block 76 or its slide and so does not modify the usual work cycle. The pressure of the spring 288 on the piston valve 284 and hence the oil pressure at which the valve will be elevated can be varied by screwing a sleeve 302, in which the upper end of the spring 288 is seated, into or out of the plate 198, thus to vary the compression of the spring. Said sleeve can be rotated by a ring 304 which is axially loose thereon but has a spline and slot connection therewith. A lock nut 306 clamps the ring in any adjusted position of the sleeve.

I claim:

1. A drilling machine including a rotatable and axially movable drill holder, driving means for rotating said holder, means including a hydraulic cylinder and piston for advancing and retracting said holder, and automatically operative fluid-actuated means governed by the positions of said holder for repeatedly advancing said holder at high and low speeds to successively advanced predetermined positions from the same intermediate position where the drill is at least far enough out of the hole to enable the drill point to be bathed in a coolant.

2. A machine tool including a tool holder, means including a hydraulic cylinder and piston for advancing and retracting said holder, a hydraulic circuit for said piston and cylinder, means responsive to the distance of advance of said holder for controlling said hydraulic circuit to effect the operation of said cylinder and piston to repeatedly advance said holder into successively advanced predetermined positions relatively to the machine at high and low speeds effective through predetermined extents of movement of said holder, and means for progressively increasing the amount of high speed advance.

3. A machine tool including a tool holder, hydraulic means for advancing and retracting said holder, and control mechanism for said hydraulic means including a reversing member operable to reverse the direction of operation of said hydraulic means to retract said holder, a slide movable with said holder, a control member for operating said reversing member movable on said slide and movable into and out of cooperative relation with said reversing member by movements of said slide, means for locking said control member to said slide in predetermined different spaced positions thereon, and means responsive to movements of said holder and operated by said reversing member for effecting a change in the position of said control member on said slide.

4. A machine tool including a tool holder, hydraulic means for advancing and retracting said holder, a reversing member operable for changing the direction of movement of said holder, a slide movable with said holder, a control member for said reversing member on said slide reciprocable into and out of operative engagement with said reversing member by movements of said slide, and means responsive to predetermined distances of advance of said holder for shifting the position of said control member corresponding distances on said slide.

5. A machine tool including a tool holder, hydraulic means for advancing and retracting said holder, a reversing member operable for changing the direction of movement of said holder, a slide movable with said holder, a control member for said reversing member on said slide reciprocable into and out of operative engagement with said reversing member by movements of said slide, means for holding said control member stationary on said slide during a retracting movement of said holder and for permitting said slide to advance relatively to said control member during an advancing movement of said holder, and means responsive to predetermined distances of advance of said holder for locking said control member to said slide for operating said reversing member.

6. A machine tool including a tool holder, hydraulic means for advancing and retracting said holder, a reversing member operable for changing the direction of movement of said holder, a slide movable with said holder, a control member for said reversing member on said slide reciprocable into and out of operative engagement with said reversing member by movements of said slide, and means for effecting the advance of said holder into successively advanced positions including means for holding said control member stationary on said slide during retracting movements of said holder for causing said slide to advance relatively to said control member during successive advancing movements of said holder of predetermined length, and means responsive to said lengths of advance for locking said control member to said slide for advance therewith into control of said reversing member.

7. A machine tool including a tool holder, hydraulic means for successively advancing and retracting said holder, a reversing member operable for changing the direction of movement of said holder, a slide movable with said holder, a control member slidable on said slide and movable therewith into and out of operative engagement with said reversing member, means governed by the position of said holder for releasably locking said control member on said slide so that said slide can move independently of said control member, and means operative upon the final retractive movement of said holder and slide for resetting said control member to its initial position on said slide.

8. A machine tool including a tool holder, hydraulic means for advancing and retracting said holder, a reversing member operable for changing the direction of movement of said holder, a slide movable with said holder, a control member slidable on said slide and when locked thereto movable therewith into and out of operative engagement with said reversing member, and means for releasably locking said control member on said slide arranged for engagement with and operation by said reversing member to release said lock.

9. A machine tool including a tool holder, hydraulic means for advancing and retracting said holder, a reversing member operable for changing the direction of movement of said holder, control mechanism for operating said reversing member including a series of reversing dogs carried by and movable with said holder each of which is adapted to effect the movement of said member into a holder-retracting position, a control device carried by and movable with and also on said holder for establishing an operative connection between said reversing member and said dogs, and means for positioning said control device successively in different positions on said holder in operative relation between said reversing member and successive dogs.

10. A machine tool including a tool holder, hydraulic means for advancing and retracting said holder, a reversing and speed control member controlling said hydraulic means having three operating positions providing respectively retraction and fast and slow rates of advance of said holder, and control mechanism for said member including a device which is movable in unison with said holder and is engageable with said member at each advancing movement of said holder to position said member into slow-advance position, a series of reversing dogs, and means which establishes an operative relation between successive dogs and said member for positioning said speed control member in reverse position at the ends of successive advancing movements of said holder.

11. A machine tool including a tool holder, hydraulic means for advancing and retracting said holder, a reversing and speed control member controlling said hydraulic means having three operating positions providing respectively retraction and fast and slow rates of advance of said holder, and control mechanism for said member including a device which is movable in unison with said holder and is engageable with said member at each advancing movement of said holder to position said member into slow-advance position, a series of reversing dogs, and means which is moved by movement of said holder into cooperative relation with said member and successive dogs at the ends of successive advancing movements of said holder.

12. A machine tool including a tool holder, hydraulic means for advancing and retracting said holder, a reversing and speed control member controlling said hydraulic means and having three operative positions providing respectively retraction and fast and slow rates of advance of said holder, a slide movable in unison with said holder, a control device on said slide and at times movable therewith and at times being independent of movement therewith and having means for moving said speed control member from a fast to a slow advance position and finally into a reverse position, a series of reversing dogs carried by said slide, and means responsive to predetermined distances of advance of said holder to position said control device successively into operative position with respect to successive dogs of said series on successive advancing movements of said holder to effect the movement of said member into reverse position following each advancing movement.

13. A machine tool including a tool holder, hydraulic means for advancing and retracting said holder, a reversing and speed control member controlling said hydraulic means and having three operative positions corresponding to retraction and fast and slow advance of said holder, means for moving said member into fast advance position, a control device movable with said holder toward and away from said member having means for moving said speed control member into slow advance and reverse positions, and means for positioning said device different predetermined distances from said member for different advancing movements of said holder for obtaining different predetermined lengths of high speed advance of said holder prior to the movement of said member into slow advance position.

14. A machine tool including a tool holder, hydraulic means for advancing and retracting said holder, a reversing and speed control member having retraction and fast and slow advance positions, a slide movable with said holder, a control device movable along said slide and advanceable and retractable with said slide toward and away from operative relation with said control member having cam means which is engageable with said control member to move it from fast to slow advance positions and which then is held stationary by said control member while said slide advances into a predetermined advanced position, and means which releasably locks said control device in its displaced position on said slide.

15. A machine tool including a tool holder, hydraulic means for advancing and retracting said holder, a reversing and speed control member having retraction and fast and slow advance positions, a slide movable with said holder, a control device movable along said slide and advanceable and retractable with said slide toward and away from operative relation with said control member having cam means which is engageable with said control member to move it from fast to slow advance positions and which then is held stationary by said control member while said slide advances into a predetermined advanced position, and a cam dog movable with said slide into engagement with said stationary control device for moving said control member into reverse position.

16. A machine tool including a tool holder, hydraulic means for advancing and retracting said holder, a reversing and speed control member having retraction and fast and slow advance positions, a slide movable with said holder, a control device movable along said slide and advanceable and retractable with said slide toward and away from operative relation with said control member having cam means which is engageable with said control member to move it from fast to slow advance positions and which then is held stationary by said control member while said slide advances into a predetermined advanced position, means which releasably locks said control device in its displaced position on said slide, and a series of cam dogs movable with said slide into successive engagement with said control device in displaced positions thereof for moving said control member into reverse position.

17. A machine tool including a tool holder, hydraulic means for advancing and retracting said holder, a reversing and speed control member having retraction and fast and slow advance positions, a slide movable with said holder, a control device movable along said slide and movable therewith toward and away from said control member, said device having cam means which is engageable with said control member to move it from fast into slow advance position and means which locks said control device releasably to said slide, said control member in its slow advance position arranged to release said locking means and also to hold said control device stationary during slow advance of said slide and holder, and means including a series of cam dogs movable with said slide into successive engagement with said control device in successive slow advance movements of said holder for operating said cam means to move said control member into retraction position.

18. In a machine tool having a tool holder, hydraulic means for advancing and retracting said holder, a reversing and speed control member having retraction and fast and slow advance positions, the combination therewith of control mechanism for said control member comprising a slide movable with said holder, a control device slidable on said slide having means for locking it releasably to said slide for movement therewith toward and away from said control member, said control device having a cam which moves said control member into slow advance position, said control member having means which when it is in slow advance position engages said locking means and operates it to unlock said control device from said slide and also holds said control device stationary, and means movable with said slide for moving said control member into retraction position and to effect the locking operation of said locking means.

19. In a machine tool having a tool holder, hydraulic means for advancing and retracting said holder, a reversing and speed control member having retraction and fast and slow advance positions, the combination therewith of control mechanism for said control member comprising a slide movable with said holder, a control device slidable on said slide having means for locking it releasably to said slide for movement therewith toward and away from said control member, said control device having a cam which moves said control member into slow advance position, said control member having means which when it is in slow advance position engages said locking means and operates it to unlock said control device from said slide and also holds said control device stationary, a cam member carried by said control device for moving said control member into retraction position, and means movable with said slide for operating said cam member.

20. In a machine tool having a tool holder, hydraulic means for advancing and retracting said holder, a reversing and speed control member having retraction and fast and slow advance positions, the combination therewith of control mechanism for said control member comprising a slide movable with said holder, a control device slidable on said slide having means for locking it releasably to said slide for movement therewith toward and away from said control member, said control device having a cam which moves said control member into slow advance position, said control member having means which when it is in slow advance position engages said locking means and operates it to unlock said control device from said slide and also holds said control device stationary, a cam member carried by said control device for moving said control member into retraction position, a series of dogs movable with said slide for operating said cam member, and means for effecting the successive operation of said cam member by successive dogs.

21. In a machine tool having a tool holder, hydraulic means for advancing and retracting said holder, a reversing and speed control member having retraction and fast and slow advance positions, the combination therewith of control mechanism for said control member comprising a slide movable with said holder, a control device slidable on said slide having means for locking it releasably to said slide for movement therewith toward and away from said control member, said control device having a cam which moves said control member into slow advance position, said control member having means which when it is in slow advance position engages said locking means and operates it to unlock said control device from said slide and also holds said control device stationary, a rocking member capable of longitudinal movement and also of rocking movement on said control device for moving said control member into retraction position, a series of cam dogs carried by said slide and adapted for engagement with said rocking member, and means operative following the engagement and operation of said rocking member by one cam dog to rock said rocking member into position behind said cam dog whereby to position it for operation only by a succeeding cam dog during a succeeding advance movement of said holder.

22. In a machine tool having a tool holder, hydraulic means for advancing and retracting said holder, a reversing and speed control member having retraction and fast and slow advance positions, the combination therewith of control mechanism for said control member comprising a slide movable with said holder, a series of teeth extended lengthwise of said slide, a control device slidable on said slide having a locking pawl in normal engagement with said teeth for locking said device releasably to said slide, said control device also having a cam which moves said control member into slow advance position and said control member having means which when it is in slow advance position engages a part of said locking means and moves said pawl into a position free from said teeth and also holds said control device stationary, a rocking member mounted in said control device for rocking and also for longitudinal movement therein having one end disposed in position to engage said control member and having an outstanding remote end, a series of cam dogs carried by said slide and disposed to engage said remote end and move said rocking member longitudinally and said control member into reverse position, and means to rock said rocking member into position behind a dog that operates it so as to position said rocking member for operation by a succeeding cam dog during a succeeding advance of said holder.

23. In a machine tool having a tool holder, hydraulic means for advancing and retracting said holder, a reversing and speed control member having retraction and fast and slow advance positions, the combination therewith of control mechanism for said control member comprising a slide movable with said holder, a control device carried by said slide toward and away from said control member and having means by which it moves said member into slow advance position at each advancing movement and is advanced from a starting position in a progressive manner along said slide during successive advancing movements thereof, and means operative after a predetermined number of advancing operations have been made to restore said control device to the starting position on said slide.

24. In a machine tool having a tool holder, hydraulic means for advancing and retracting said holder, a reversing and speed control member having retraction and fast and slow advance positions, the combination therewith of control mechanism for said control member comprising a slide movable with said holder, a control device carried by said slide toward and away from said control member and having means by which it moves said member into slow advance position at each advancing movement and is advanced from a starting position in a progressive manner along said slide during successive advancing movements thereof, means operative after a predetermined number of advancing operations have been made to restore said control device to the starting position on said slide comprising a stationarily-located abutment member normally disposed out of the path of movement of said control device, and means to dispose said abutment member in the rear of the path of movement of said control device after a selected number of operations of said holder, whereby to hold said control device from movement on said slide during the retracting movement thereof.

25. A machine tool as defined in claim 24 wherein the position of said abutment member is controlled by movements of said slide.

26. In a machine tool having a tool holder, hydraulic means for advancing and retracting said holder, a reversing and speed control member having retraction and fast and slow advance positions, the combination therewith of control mechanism for said control member comprising a slide movable with said holder, a control device carried by said slide toward and away from said control member and having means by which it moves said member into slow advance position at each advancing movement and is advanced from a starting position in a progressive manner along said slide during successive advancing movements thereof, and means operative after a predetermined number of advancing operations have been made to restore said control device to the starting position on said slide comprising an abutment member located in position where it can engage said control member in its starting position and hold said control member from advancing movement with said slide, means movable with said slide for positioning said abutment member out of engagement with said control device, and means also movable with said slide into operative engagement with said abutment when said holder has been advanced to its extreme advanced position to position said abutment member behind said control device and hold it stationary during retraction of said holder and slide.

27. A machine tool including a tool holder, hydraulic means for advancing and retracting said holder, a valve for controlling the advance and retraction of said hydraulic means, a reversing member for controlling the position of said valve, means movable with said holder for operating said reversing member to retract said holder when it is in advanced position, a control valve for controlling the position of said first valve, means movable with said holder for operating said control valve to advance said holder when it is in retracted position, and means governed by a predetermined advanced position of said holder for disabling said control valve operating means and for effecting retraction of said holder into a fully retracted position.

28. A machine tool including a tool holder, hydraulic means for advancing and retracting said holder, automatic means for controlling said hydraulic means for retracting said holder from a predetermined advanced position thereof toward a fully retracted position, means including a control valve for controlling said hydraulic means to advance said holder from an intermediate retracted position, a latch member movable with said holder arranged to operate said valve at an intermediate retracted position of said holder, a slide movable with said holder, a control device on said slide having a latch member disabling means, and means to hold said slide stationary during a retracting movement of said holder and latch member and to cause the disabling of said latch member whereby to effect a continued movement of said holder beyond said intermediate retracted position.

29. A machine tool including a tool holder, hydraulic means to advance and retract said holder, and control mechanism for said hydraulic means including a speed controlling and reversing member having a retraction and fast and slow advance positions, a slide movable with said holder, a control device on said slide having means to move said reversing member from fast to slow advance position, means for effecting the progressive displacement of said control device on said slide away from a starting position at successive advancing movements of said holder, means for effecting the return of said control device to starting position after a predetermined number of advancing movements of said holder, means including a control valve for effecting the advance of said holder from an intermediate retracted position, a latch member movable with said holder in a retracting movement thereof into controlling position with said control valve to secure the advance of said holder, and said control device having means which effects the disabling of said latch member so that said holder is caused to pass further beyond said intermediate retracted position, and means movable with said holder for stopping said holder in a fully retracted position.

30. A machine tool including a tool holder, hydraulic means to advance and retract said holder, and control mechanism for said hydraulic means including a speed controlling and reversing member having a retraction and fast and slow advance positions, a slide movable with said holder, a control device on said slide having means to move said reversing member from fast to slow advance position, means for effecting the progressive displacement of said control device on said slide away from a starting position at successive advancing movements of said holder, means for effecting the return of said control device to starting position after a predetermined number of advancing movements of said holder, means including a control valve for effecting the advance of said holder from an intermediate retracted position, a latch member movable with said holder in a retracting movement thereof into controlling position with said control valve to secure the advance of said holder, means including a valve operable independently of the aforesaid elements to effect the advance and retraction of said holder, and latch member disabling means operated by said valve for effecting the retraction of said holder beyond said intermediate retracted position into a further retracted position.

31. In a machine tool including a tool holder, means for advancing said holder into successively different predetermined positions with respect to the machine in successive advancing movements, means responsive to the predetermined distances of advance of said holder for retracting said holder to the same retracted position between alternate advancing movements, and means responsive to an abnormal pressure on said holder for retracting said holder at any position of advance thereof independently of the control thereof by said advancing means.

32. In a machine tool including a tool holder, means for advancing said holder into successively different predetermined positions with respect to the machine in successive advancing movements, means responsive to the advance of said holder into said positions, means responsive to the distance of advance of said holder for retracting said holder to the same retracted position between alternate advancing movements, and means responsive to the resistance to forward movement of said holder for alternately retracting and advancing said holder repeatedly until the disappearance of such abnormal pressure independently of the control of said holder by said advancing means.

33. In a step drilling machine, the combination of a cylinder, a piston, a piston rod connected therewith, a tool member connected to and movable by said piston rod, a hydraulic circuit including means for delivering fluid to and receiving fluid from the opposite ends of said cylinder to cause reciprocation of the tool relative to the work, means movable in unison with said piston rod and cooperating with a plurality of valve units for moving said piston and said tool in a series of progressively advancing reciprocating strokes in cycles, each cycle comprising a rapid traverse movement towards the work a relatively slow feed rate movement through a portion of the work and a rapid traverse movement from the work, and accumulating stop means responsive to the feed movement in each cycle for progressively increasing the depth of rapid traverse in the succeeding cycle thereby advancing the feed range.

34. A step drilling machine comprising in combination a drill or drills, cylinder and piston structure connected to and controlling the movement of said drill, control means movable in unison with said piston rod, a hydraulic circuit for feeding liquid to and from opposite sides of said piston to cause reciprocation of the drill relative to the work and a plurality of valve means positioned relative to said control means so as to be operated thereby, hydraulic means responsive to the operation of said valves for moving said drill in a series of progressively advancing reciprocating strokes in cycles, each cycle comprising movements towards the work in rapid traverse, into the work at a predetermined feed rate and from the work at rapid traverse, accumulating stop means carried by said control means and responsive to the feed movement in each cycle for advancing the range of each feed stroke to progressively increase the depth of the drill, and manual means for resetting all parts and return the drill to the starting point at any time.

35. A step drilling machine comprising in combination a drill or drills, cylinder and piston structure connected to and controlling the movement of said drill, control means movable in unison with said piston rod, a hydraulic circuit for feeding liquid to and from opposite sides of said piston to cause reciprocation of the drill relative to the work and a plurality of valve means positioned relative to said control means so as to be operated thereby, hydraulic means responsive to the operation of said valves for moving said drill in a series of progressively advancing reciprocating strokes in cycles, each cycle comprising movements towards the work in rapid traverse, into the work at a predetermined feed rate and from the work at rapid traverse, accumulating stop means carried by said control means and responsive to the feed movement in each cycle for advancing the range of each feed stroke to progressively increase the depth of the drill, and means responsive to the final drilling step for automatically resetting all stops and controls at the finish of the drilling operation.

36. A machine for drilling deep holes comprising a rotatable and axially movable drill holder, driving means for rotating said holder, hydraulic means for moving said holder axially, means controlling said hydraulic means for effecting its operation for advancing said holder from a fully retracted position toward the work, means defining an intermediate retracted position for said holder wherein the drill is so far out of the hole that the drill point is accessible to a coolant, and means controlling the operation of said hydraulic means for repeatedly advancing said holder predetermined progressively increased distances from said intermediate retracted position toward the work, and means for finally retracting said holder to said fully retracted position.

37. A deep hole drilling machine comprising a drill spindle, driving means for rotating said spindle, hydraulic means for advancing said spindle independently of said driving means to pass the drill into the article to be drilled, means responsive to selected points of advance of the spindle for reversing said hydraulic means to retract said spindle each time to an intermediate position where the drill point is accessible to a coolant, means for controlling said hydraulic means to again reverse said hydraulic means to cause the same to readvance said spindle at high speed to substantially the point from which it was retracted, means for controlling said hydraulic means to reduce the rate of operation thereof to cause the same to continue the advance of the spindle at a lower rate of speed, means for automatically reversing said hydraulic means to retract said spindle into a fully retracted position after said drill has completed its operation, and means responsive to the resistance to the advancing movement of said drill for reversing said hydraulic means to retract said spindle to said intermediate retracted position from any position of advance of said drill and each time said resistance reaches a predetermined maximum.

38. A deep hole drilling machine having an axially movable drill spindle, hydraulic means for reciprocating said spindle from a fully retracted position toward and away from the work, a drive for rotating said spindle, means for operating said hydraulic means to advance said spindle axially toward the work to move the drill and the work into engagement with each other, means responsive to selected points of advance of the drill for reversing said hydraulic means to successively retract said spindle at high speed and to disengage the drill and the work, means for operating said hydraulic means to stop said spindle in its successive retracting movements at a point where the drill is out of the hole and to readvance it at high speed, and means for operating said hydraulic means to arrest the rapid advance of said spindle at substantially the point from which it was retracted and to continue its advance at slow speed.

39. A deep hole drilling machine having an axially movable drill spindle, hydraulic means for reciprocating said spindle from a fully retracted position toward and away from the work, a drive for rotating said spindle, means for operating said hydraulic means to advance said spindle axially toward the work to move the drill and the work into engagement with each other, means responsive to selected points of advance of the drill for reversing said hydraulic means to successively retract said spindle at high speed and to disengage the drill and the work, means for operating said hydraulic means to stop said spindle in its successive retracting movements at a point where the drill is out of the hole and to readvance it at high speed, means for changing the rate of operation of said hydraulic means to arrest the rapid advance of said spindle at substantially the point from which it was retracted and to continue its advance at slow speed, and means operable at any advanced position of said spindle in response to an abnormal increase in resistance to drill advance for reversing said hydraulic means to retract said spindle at high speed into said intermediate retracted position.

40. A drilling machine comprising a drill-driving spindle, driving means for rotating said spindle, a hydraulic feed for advancing and retracting said spindle, and control mechanism for said hydraulic feed including means controlling said feed for advancing said spindle from a fully retracted position thereof, means controlling said feed for retracting said spindle successively from a successive number of predetermined advanced positions of said spindle with respect to the machine into the same partially retracted position where the drill is out of the hole, means operable upon the arrival of said spindle into said partially retracted position for controlling said feed for advancing said spindle therefrom, and means operable upon the arrival of said spindle into its furthermost advanced position for controlling said feed for retracting said spindle into fully retracted position and holding it thereat.

41. A drilling machine comprising a spindle, driving means for rotating said spindle, a hydraulic feed for advancing and retracting said spindle, and control mechanism for said hydraulic feed including means controlling said feed for advancing said spindle from a fully retracted position thereof, means controlling said feed for retracting said spindle successively from a successive number of predetermined advanced positions of said spindle with respect to the machine into the same partially retracted position where the drill is out of the hole, means operable upon the arrival of said spindle into said partially retracted position for controlling said feed for advancing said spindle therefrom, means operable upon the arrival of said spindle into its furthermost advanced position for controlling said feed for retracting said spindle into fully retracted position and holding it thereat, and manual means for controlling the advance and retraction of said spindle independently of control by said aforesaid control means.

42. In a step drilling machine, the combination of a cylinder, a piston, a piston rod connected therewith, a tool member connected to and movable by said piston rod, a hydraulic circuit including means for delivering fluid to and receiving fluid from the opposite ends of said cylinder to cause reciprocation of the tool relative to the work, means movable in unison with said piston rod and cooperating with a plurality of valve units for moving said piston and said tool in a series of progressively advancing reciprocating strokes in cycles, each cycle comprising a rapid traverse movement towards the work a relatively slow feed rate movement through a portion of the work and a rapid traverse movement from the work, accumulating stop means responsive to the feed movement in each cycle for progressively increasing the depth of rapid traverse in the succeeding cycle thereby advancing the feed range, and adjustable means coordinated with the operation of said valves for controlling the length of each feed stroke.

43. In a step drilling machine, the combination of a cylinder, a piston, a piston rod connected therewith, a tool member connected to and movable by said piston rod, a hydraulic circuit including means for delivering fluid to and receiving fluid from the opposite ends of said cylinder to cause reciprocation of the tool relative to the work, means movable in unison with said piston rod and cooperating with a plurality of valve units for moving said piston and said tool in a series of progressively advancing reciprocating strokes in cycles, each cycle comprising a rapid traverse movement towards the work a relatively slow feed rate movement through a portion of the work and a rapid traverse movement from the work, accumulating stop means responsive to the feed movement in each cycle for progressively increasing the depth of rapid traverse in the succeeding cycle and thereby advancing the feed range, adjustable means coordinated with the operation of said valves for controlling the length of each feed stroke, and adjustable means cooperating with said second named means for regulating the clearance between the end of the rapid traverse stroke and the contact between the tool and the work.

44. In a step drilling machine, the combination of a cylinder, a piston, a piston rod connected therewith, a tool member connected to and movable by said piston rod, a hydraulic circuit including means for delivering fluid to and receiving fluid from the opposite ends of said cylinder to cause reciprocation of the tool relative to the work, means movable in unison with said piston rod and cooperating with a plurality of valve units for moving said piston and said tool in a series of progressively advancing reciprocating strokes in cycles, each cycle comprising a rapid traverse movement towards the work a relatively slow feed rate movement through a portion of the work and a rapid traverse movement from the work, accumulating stop means responsive to the feed movement in each cycle for progressively increasing the depth of rapid traverse in the succeeding cycle and thereby advancing the feed range, adjustable means coordinated with the operation of said valves for controlling the speed of and length of each feed stroke, and automatically shiftable stop means cooperating with said second named means for hydraulically controlling the application of pressure for progressively advancing the feed position of the tool.

45. In a step drilling machine, the combination of a cylinder, a piston, a piston rod connected therewith, a tool member connected to and movable by said piston rod, a hydraulic circuit including means for delivering liquid to and receiving liquid from the opposite ends of said cylinder to cause reciprocation of the tool relative to the work, means movable in unison with said piston rod and cooperating with a plurality of valve units for modifying the flow of liquid to and from said cylinder for moving said piston and said tool in a series of progressively advancing reciprocating strokes in cycles, each cycle comprising a rapid traverse movement towards the work, a relatively slow feed rate movement through a portion of the work and a rapid traverse movement from the work, adjustable means coordinated with the operation of said valves for controlling the duration of each feed stroke, automatically shiftable stop means cooperating with said second named means for hydraulically controlling the application of pressure for progressively advancing the feed position of the tool, and adjustable means cooperating with said second named means and last named means for regulating the clearance between the end of the rapid traverse stroke and the contact between the tool and the work.

46. A step drilling machine comprising in combination a cylinder, a piston, a piston rod connected to a drill or drills, a hydraulic circuit for delivering fluid to and from the opposite ends of said cylinder, a pump for continuously circulating liquid through the circuit, hydraulic means for moving the piston and the drill to and from the work at rapid traverse, automatically acting stop means for changing the rapid traverse into a feed rate and for controlling the position of feeding said drill into the work at progressively increasing depths, means for controlling the length of each feed depth, hydraulic means for controlling the rate of movement during the feeding step, and independently adjustable means for regulating the clearance between the finish of the rapid traverse and the contact of the drill with the work.

47. A step drilling machine comprising in combination a drill driving member, a cylinder and a piston therein, a piston rod connecting said piston to said drill, control means movable in unison with said piston rod, a hydraulic circuit for feeding liquid to and from opposite sides of said piston to cause reciprocation of the drill relative to the work, a plurality of valve elements cooperating through a single operating member with said control means, and a second set of plurality of valve members cooperating through a single member with said control means, and hydraulic means controlled by said valve elements for moving the piston and drill in a series of progressively advancing reciprocating strokes in cycles, each cycle comprising a rapid traverse movement towards and from the work and a predetermined relatively slow rate through the work, means for reversing the drill at the end of each feed stoke, and means for varying the feed path with each drilling step to progressively increase the depth of the drill.

48. A step drilling machine comprising in combination a drill or drills, cylinder and piston structure connected to and controlling the movement of said drill, a hydraulic circuit for delivering liquid to and from opposite ends of said cylinder, valve structure for controlling the hydraulic movement of said piston and said drill or drills in a series of progressively advancing reciprocating strokes in cycles, each cycle comprising rapid traverse feed and return rapid traverse strokes, accumulating stop means responsive to the movement of said drill through one feed stroke to determine the position of the next feed stroke for controlling the feeding of said drill into the work to progressively increasing depths, and a single unit for controlling the duration of each feed stroke and the initiation of the rapid traverse return stroke of the drill.

49. A step drilling machine comprising in combination a drill or drills, cylinder and piston structure connected to and controlling the movement of said drill, a hydraulic circuit for delivering fluid to and from opposite ends of said cylinder, valve structure for hydraulically moving said piston and said drill or drills in a series of progressively advancing reciprocating strokes in cycles, each cycle comprising rapid traverse, feed and return rapid traverse strokes, accumulating stop means responsive to the feed movement in each cycle for progressively increasing the depth of rapid traverse in the succeeding cycle and thereby advancing the feed range, and manual means operable for reversing the drill at any time independently of and without resetting accumulating stops.

50. In an attachment of the character described for drill presses, the combination of a hydraulic unit for ready attachment to a drill press frame, and a piston rod carried by said attachment and connected to and controlling the movement of said drill, control means movable in unison with said piston rod, a hydraulic circuit for feeding liquid to and from opposite sides of said piston and a plurality of valve means positioned relative to said control means so as to be operated thereby, hydraulic means responsive to the operation of said valves for successively moving said drill in a series of progressively advancing reciprocating strokes in cycles, each cycle comprising movements towards the work at rapid traverse, into the work at a predetermined feed rate and from the work at rapid traverse, accumulating stop means responsive to the feed movement in each cycle for progressively increasing the depth of rapid traverse in the succeeding cycle and thereby advancing the feed range, and manual means for resetting all parts and return the drill to the starting point at any time, and means operable for reversing the drill at any time independently of and without resetting any stops or control means whereby the drill will return to its work at the point where it was reversed when progressive step drilling is resumed.

51. In a step drilling machine, the combination of a cylinder, a piston, a piston rod connected therewith, a tool member connected to and movable by said piston rod, a hydraulic circuit including means for delivering fluid to and receiving fluid from the opposite ends of said cylinder to cause reciprocation of the tool relative to the work, means movable in unison with said piston rod and cooperating with a plurality of valve units for moving said piston and said tool in a series of progressively advancing reciprocating strokes in cycles, each cycle comprising a rapid traverse movement towards the work, a relatively slow feed rate movement through a portion of the work and a rapid traverse movement from the work, adjustable means coordinated with the operation of said valves for controlling the length of each feed stroke, and manual means operable in combination with said second named means for changing the rate of normal feeding.

52. A deep hole drilling machine including a drill holder, hydraulic means for advancing and retracting said holder, and automatically operative control mechanism for said hydraulic means including means to advance said holder from a fully retracted position, means responsive to successively increased predetermined distances of advance of said holder with respect to the machine to alternately advance and retract said holder from and to the same predetermined intermediate retracted position where the drill is sufficiently out of the hole for the drill point to be in position to be bathed in a coolant, and means responsive to the advance of the holder to the longest predetermined distance of advance to finally retract said holder to said fully retracted position.

53. A hydraulic step drilling machine comprising a reciprocable drill holder adapted to receive a drill, a hydraulic piston and cylinder associated with said holder for advancing and retracting it different amounts and at different speeds, means providing a hydraulic circuit for said cylinder, valve means controlling said circuit, and control means for said valve means responsive to predetermined positions of said drill holder and operative to advance the drill at slow speed into the work by a succession of short steps of predetermined length with intervening high speed movements of the drill point out of the hole and into the hole to the bottom thereof, the first step being preceded by a high speed advance of the drill to the start of the hole from an idle position and the final step being succeeded by a high speed retraction of the drill into an idle position.

54. A hydraulic step drilling machine comprising a reciprocable drill holder adapted to receive a drill, a hydraulic piston and cylinder associated with said holder for advancing and retracting it different amounts, means providing a hydraulic circuit for said cylinder, valve means controlling said circuit, and control means for said valve means responsive to predetermined positions of said drill holder with respect to the machine and operative to advance the drill into the work by a succession of short steps of predetermined length and to withdraw the point of the drill out of the hole between successive steps.

55. A hydraulic step drilling machine comprising a reciprocable drill holder adapted to receive a drill, a hydraulic piston and cylinder associated with said holder for advancing and retracting it different amounts and at different speeds, means providing a hydraulic circuit for said cylinder, valve means controlling said circuit, means for defining a plurality of definite drilling depth steps, and control means for said valve means controlled by said step defining means and operative to advance the drill into the work by successive steps of the lengths defined by said defining means and to withdraw the drill point out of the hole between successive steps.

56. A hydraulic step drilling machine as in claim 53, including means responsive to an abnormal pressure on the holder for retracting said holder independently of the control thereof by said advancing means.

57. A hydraulic step drilling machine as in claim 54, including means responsive to an abnormal pressure on the holder for retracting said holder independently of the control thereof by said advancing means.

58. A hydraulic step drilling machine as in claim 55, including means responsive to an abnormal pressure on the holder for retracting said holder independently of the control thereof by said advancing means.

59. A hydraulic step drilling machine comprising a reciprocable drill holder adapted to receive a drill, a hydraulic piston and cylinder associated with said holder for advancing and retracting it different amounts, means providing a hydraulic circuit for said cylinder, valve means controlling said circuit and control means for said valve means responsive to predetermined positions of said drill holder with respect to the machine and operative to advance the drill into the work by a succession of short steps of predetermined length and to withdraw the point of the drill at least close enough to the mouth of the hole to permit access thereto of a coolant between successive steps.

60. A machine tool including a rotatably and axially movable tool holder, means for rotating said holder, hydraulic means for reciprocating the holder axially toward and away from the work, means defining different predetermined successive positions of advance of the tool holder, hydraulic means in control of said hydraulic reciprocating means responsive to the location of the tool at an aforesaid position for retracting it and for then readvancing it rapidly to its position prior to retraction and slowly beyond such position, and means governed by the advancing movement of the holder for moving the holder further in the direction of the work each time it is advanced.

61. A machine tool including a tool holder, hydraulic means for advancing and retracting said holder, means including a reversing member for changing the direction of action of said hydraulic means, a control member having a plurality of positions relatively to said tool holder and movable therewith for operating said reversing member to effect the retraction of said holder repeatedly to the same position, means for effecting the advance of said holder repeatedly from said position, and means for shifting the position of said control member with respect to said holder by steps of predetermined extent to effect different distances of movement of said holder before gaining control of said reversing member through said control member.

62. A machine tool including a tool holder, hydraulic means for advancing and retracting said holder, means including a reversing member for changing the direction of action of said hydraulic means, a control member movable with said holder for operating said reversing member to effect retraction of said holder repeatedly to the same position, means for effecting the advance of said holder repeatedly from said position, means for shifting the position of said control member relatively to said holder, and means movable with said holder and providing elements defining different predetermined distances of advance of said holder successively engageable with said control member to advance it with the advance of said holder into control of said reversing member.

63. A machine tool including a tool holder, hydraulic means for advancing and retracting said holder, automatic means controlling said hydraulic means for successively retracting said holder from successively different predetermined advanced positions to the same intermediate retracted position, means including a control member operated by the arrival of said holder in said intermediate retracted position for controlling said hydraulic means for advancing said holder from said intermediate retracted position, a latch member carried by and movable with said holder for operating said control member to effect the advance of said holder when said holder is in said intermediate retracted position, and means responsive to the advance of said holder into a predetermined advanced position for disabling said latch member and for controlling said hydraulic means for moving said holder through said intermediate retracted position into fully advanced position.

64. A machine tool including a tool holder, hydraulic means for advancing and retracting said holder, automatic means controlling said hydraulic means for successively retracting said holder from successively different predetermined advanced positions to the same intermediate retracted position, means including a control member operative upon the arrival of said holder in said intermediate retracted position for controlling said hydraulic means for advancing said holder from said intermediate retracted position, a latch member movable with said holder for operating said control member to effect the advance of said holder when said holder is in said intermediate retracted position, and manually controlled hydraulic means independent of said holder and of said retracting means for operating said control means to effect the retraction of said holder into a fully retracted position.

65. A machine for drilling deep holes comprising a rotatably and axially movable drill holder, driving means for rotating said holder, hydraulic means for moving said holder axially, valve control means for said hydraulic means, means controlling said valve means for effecting the advance of said holder from a fully retracted position toward the work, means controlling said valve means for effecting the repeated advance of said holder predetermined progressively increased distances toward the work from an intermediate retracted position where the drill is so far out of the hole that the drill point is accessible to a coolant, means controlling said valve means for effecting the final retraction of said holder to said fully retracted position, and fluid actuated means responsive to the resistance to forward movement of said holder for retracting it independently of the control thereof by the aforesaid means.

66. A drilling machine comprising a frame, a spindle arranged in said frame, driving means for rotating said spindle, hydraulic means for advancing said spindle independently of said driving means, means for controlling said hydraulic means and responsive to a predetermined distance of advance of said spindle with respect to the frame for reversing said hydraulic means for effecting the retraction of said spindle, means controlling said hydraulic means for automatically reversing the direction of operation of said hydraulic means to cause the same to readvance said spindle at high speed, means controlling said hydraulic means for changing the rate of operation thereof for causing said hydraulic means to advance said spindle at slow speed a predetermined distance after it has reached a certain predetermined point in its advance, and means responsive to the resistance to the advancing movement of said spindle for reversing said hydraulic means and causing said spindle to be retracted from any advanced position thereof.

ERIC J. HIRVONEN.